United States Patent [19]

Marinoff

[11] 4,225,872

[45] Sep. 30, 1980

[54] INK JET PRINTER

[75] Inventor: George Marinoff, Dayton, Ohio

[73] Assignee: The Mead Corporation, Dayton, Ohio

[21] Appl. No.: 7,999

[22] Filed: Jan. 31, 1979

[51] Int. Cl.² .................... G01D 15/18; G01D 15/24; B65H 5/22

[52] U.S. Cl. .................................... 346/75; 346/1.1; 346/138; 271/3; 400/126

[58] Field of Search .................... 346/1, 75, 134, 138; 271/3, 4, 9, 276, 277; 400/126

[56] References Cited

U.S. PATENT DOCUMENTS

| | | | |
|---|---|---|---|
| 3,689,693 | 9/1972 | Cahill et al. | 346/75 X |
| 3,796,154 | 3/1974 | Weisgerber . | |
| 3,808,603 | 4/1974 | Degreve et al. | 346/138 |
| 3,884,461 | 5/1975 | Hauser | 271/3 X |
| 4,009,332 | 2/1977 | Van Hook | 346/75 X |
| 4,029,009 | 6/1977 | Kuhn et al. . | |
| 4,047,085 | 9/1977 | Ollendick | 400/126 |
| 4,101,018 | 7/1978 | Sokolowski | 271/3 X |
| 4,106,061 | 8/1978 | Burnett . | |
| 4,112,469 | 9/1978 | Paranjpe et al. | 346/138 X |
| 4,157,178 | 6/1979 | Ollendick | 346/138 X |

*Primary Examiner*—George H. Miller, Jr.

*Attorney, Agent, or Firm*—Biebel, French & Nauman

[57] ABSTRACT

An ink jet printer includes a rotatable support means for supporting a sheet of paper, a rotary drive means for rotating the support means, and an ink jet print head mounted adjacent the support means for printing on a sheet of paper supported thereon during a plurality of successive rotations of the support means. A paper supply means loads a sheet of paper onto the support means such that the sheet of paper is supported thereby. A paper ejector means removes a sheet of paper from the support means. A control means controls operation of the paper supply means and the paper ejector means such that as a sheet of paper is removed, after a plurality of rotations on the support means, another sheet is concurrently loaded onto the support means, whereby the time required for loading and unloading a sheet of paper is minimized and the overall speed of the printer enhanced.

15 Claims, 14 Drawing Figures

INK JET PRINTER

BACKGROUND OF THE INVENTION

The present invention relates to apparatus for handling sheets of print receiving material during a print operation and, more particularly, to a paper handling system for an ink jet printer in which sheets of print receiving medium are successively loaded onto a sheet supporting drum which is rotated adjacent a print head. Each sheet is removed from the drum after printing on the sheet has been accomplished during a plurality of drum rotations.

Such a printer, utilized in an ink jet copier is disclosed in U.S. Pat. No. 4,106,061, issued Aug. 8, 1978, to Burnett. The Burnett patent discloses a paper supporting drum upon which is mounted a sheet of copy paper. The drum has associated therewith an ink jet printer which is moved parallel to the axis of rotation of the drum during a plurality of drum rotations as scanning is performed in a corresponding manner across an original document. A plurality of vacuum belts cooperate with evacuated chambers beneath the belts to transfer copy paper from a supply tray to the drum for printing and, after the printing operation is completed, to transfer the printed copies to a storage tray. Printing is accomplished during a plurality of rotations of the paper supporting drum during which time the ink jet printer prints in a helically interlaced pattern on the copy paper.

Other arrangements are known for depositing drops along a plurality of print lines on a sheet of paper mounted on a rotating drum, such as shown in U.S. Pat. No. 3,689,693, issued Sept. 5, 1972, to Cahill et al. Cahill discloses a plurality of jet streams directed toward the print receiving medium such that each jet stream will print a band of adjacent print lines which do not interlace with print lines printed by others of the jet streams.

In prior art printers, loading a sheet of paper onto a rotating drum for printing and subsequently removing the sheet of paper from the drum after printing have generally taken a substantial amount of time for each printed sheet. Such printing devices have generally processed only a single sheet of paper at a time, i.e., a sheet is printed and completely removed from the drum and transported to the appropriate storage tray prior to initiation of the loading operation for the next sheet to be printed.

U.S. Pat. No. 4,029,009, issued June 14, 1977, to Kuhn et al discloses a sheet handling arrangement in which a sheet is loaded onto a drum prior to complete removal of the sheet previously loaded onto the drum. The drum, however, is a transfer roller, located between print rollers, which is designed specifically for reversing the sheet side for side during the transfer between the printing rollers. The transfer roller is not appropriate for use as a paper supporting drum in a system requiring a plurality of passes of a sheet past a printing device.

SUMMARY OF THE INVENTION

A printer for successively printing upon a plurality of sheets of print receiving material by printing along a plurality of print lines on each sheet includes a rotatable support means for supporting a sheet of print receiving material. A drive means rotates the rotatable support means and a supply means, positioned adjacent one side of the rotatable support means, loads a sheet of print receiving material onto the rotatable support means. A print head, adjacent the rotatable support means, prints along a number of the plurality of print lines during each rotation of the rotatable support means such that after a plurality of rotations of the rotatable support means, printing is accomplished along all of the plurality of print lines. An ejector means is positioned adjacent the rotatable support means on the side thereof substantially opposite the supply means. The ejector means removes the sheet of print receiving material from the rotatable support means after printing is accomplished along all of the plurality of print lines. A control means controls loading of a sheet by the supply means and removal of a sheet by the ejector means such that printing is initiated on a sheet before the sheet is completely loaded onto the support means, and continues during a plurality of rotations of the support means. Printing terminates with respect to a sheet after a portion of the sheet has been removed from the rotatable support means, whereby the time required for loading and unloading of a sheet is minimized and the overall speed of the printer is enhanced.

The control means controls loading of a sheet by the supply means such that loading is initated before the sheet previously loaded onto the rotatable support means is completely printed. The control means controls removal of a sheet by the ejector means such that removal of a sheet is initiated before printing of the sheet is completed. A sheet is not completely removed until after loading and printing of the next sheet is begun.

The control means may comprises a cam means, means for rotating the cam means at a rotational velocity related to the rotational velocity of the rotatable support means, supply cam follower means, cooperating with the cam means, for actuating the supply means, and ejector cam follower means cooperating with the cam means, for actuating the ejector means.

Accordingly, it is an object of the present invention to provide a printer and a method of handling a plurality of sheets of print receiving material in a printer in which the sheets are loaded successively onto a sheet supporting drum for printing before the sheet previously loaded onto the drum is completely printed and removed; to provide such a device and method in which printing is initiated on a sheet as it is loaded onto the drum before the previously printed sheet is completely removed from the drum; and to provide such a device and method in which a cam control arrangement controls timing and operation of sheet loading and ejection elements.

DETAILED DESCRIPTION OF THE PREFERRED EMBODIMENTS

Figure 1:
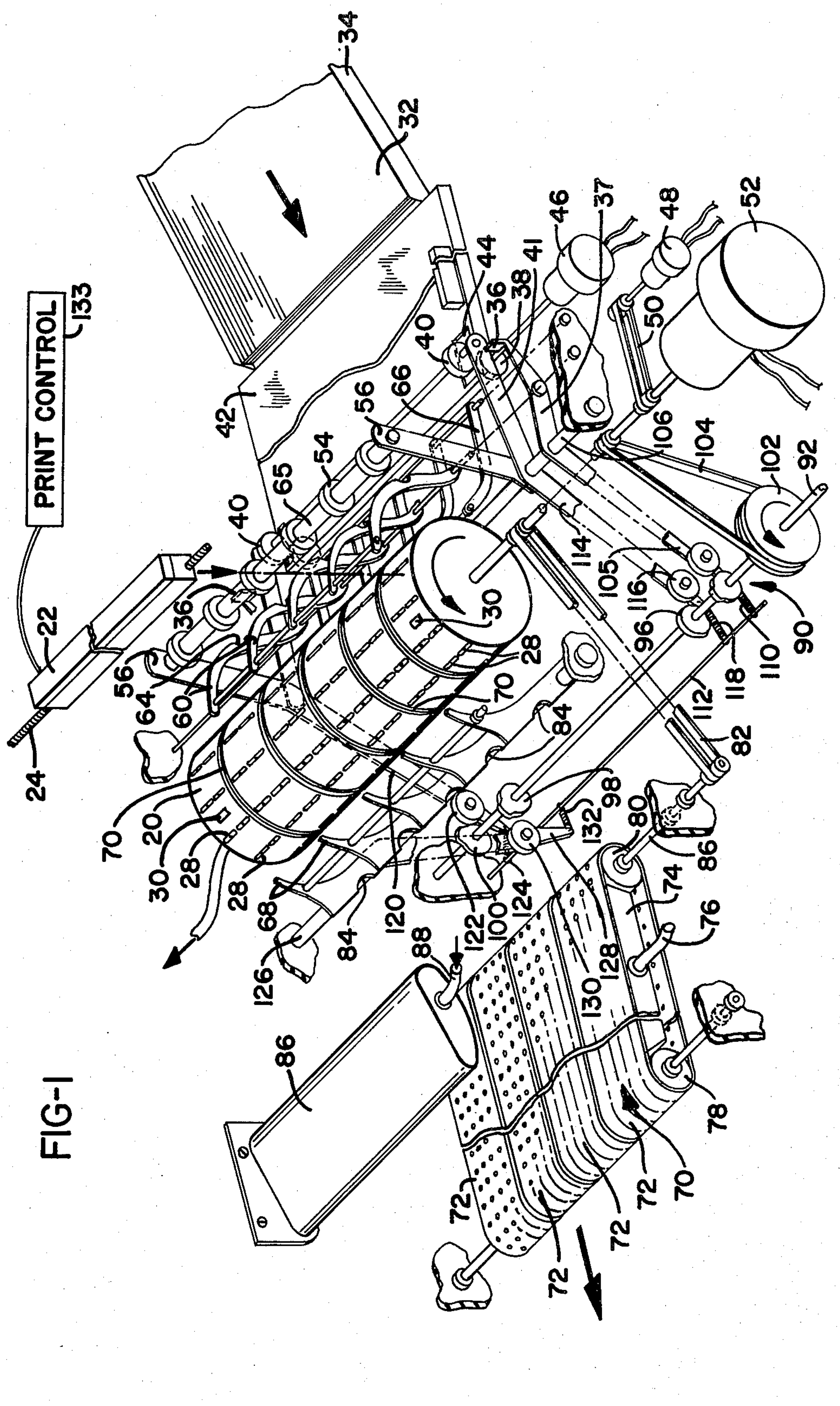
FIG. 1 is an exploded perspective view of the printer of the present invention, with portions broken away and removed.
Figures 2, 3:
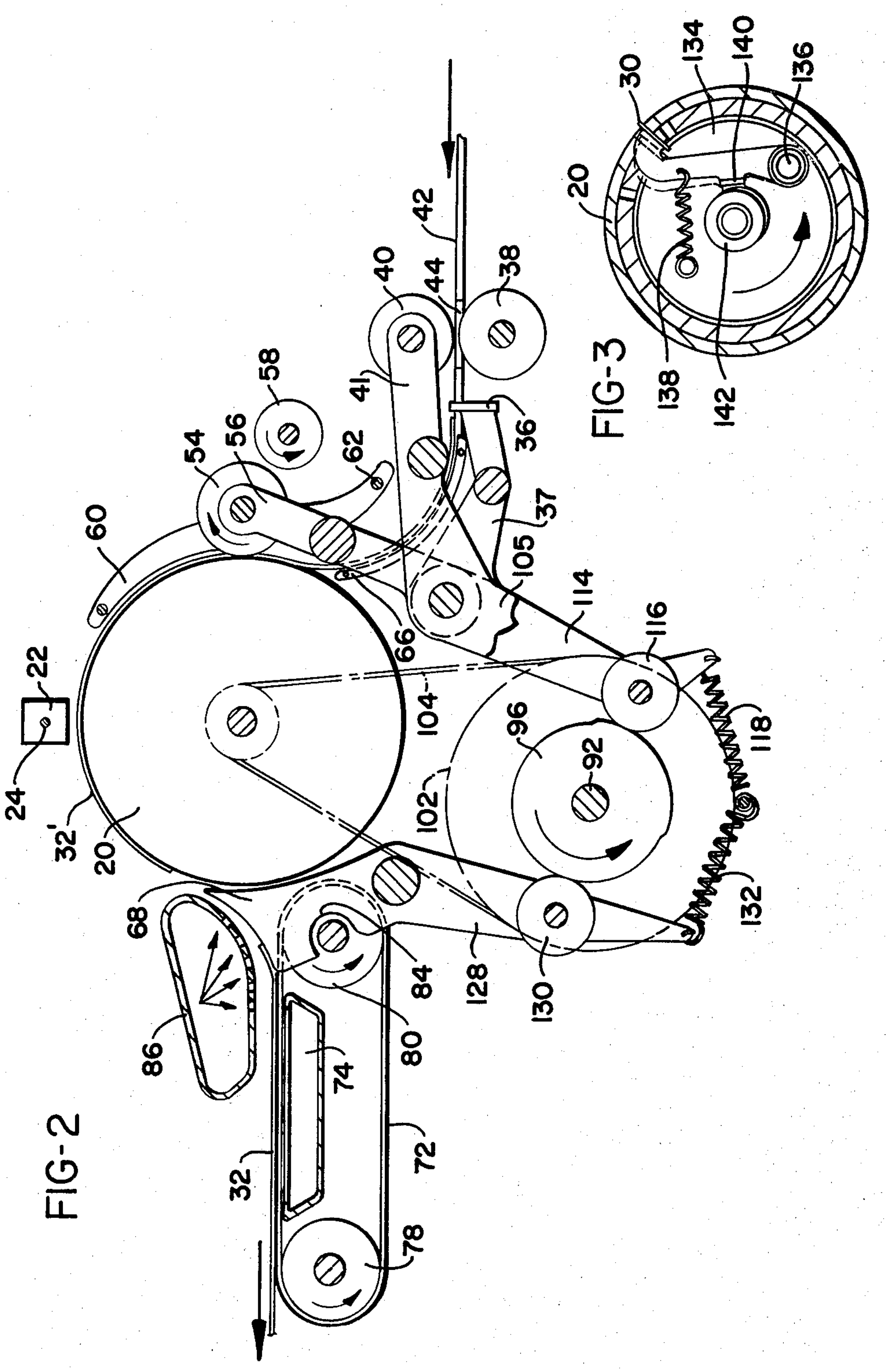
FIG. 2 is a side view of the printer, with portions broken away and in section.
FIG. 3 is a sectional view of the sheet supporting drum, taken in a plane generally perpendicular to the axis of rotation of the drum.

Reference is now made to FIGS. 1 and 2 which illustrate the printer of the present invention. A rotatable support means for supporting a sheet of print receiving material, such as copy paper, comprises a paper supporting drum 20. Drum 20, mounted for rotation adjacent ink jet print head 22, supports a sheet of paper during a plurality of rotations as the print head 22 deposits ink drops along print lines on the paper. During printing, the print head 22 is moved in a direction parallel to the axis of rotation of the drum 20 by means of a threaded rod 24, such that a plurality of helical print lines on the paper are printed to provide complete print coverage across the width of the paper. Drum 20 defines interior vacuum chambers which communicate with a vacuum line 26 and a plurality of slots 28 in the periphery of drum 20 in order to hold a sheet of copy paper on the drum 20 securely by means of the vacuum. As more completely described below, retractable stops 30 are provided on the periphery of drum 20 to assist in positioning a sheet of copy paper as the sheet is loaded onto the drum.

A paper supply means is provided for loading a sheet of paper 32 stored in tray 34 onto the drum 20. A sheet of paper is delivered by a sheet supply arrangement (not shown) of conventional design to a position defined by a pair of paper stops 36 which engage the leading edge of the sheet. Paper stops 36 at the ends of arms 37 are positioned between a pair of supply rollers 38 and 40 and drum 20. Supply rollers 38 and 40 are initially positioned apart, as shown in FIG. 2, and at the appropriate time, as discussed more completely below, supply roller 40, rotatably mounted on the ends of arms 41, is lowered such that a sheet of paper is pinched between roller 40 and roller 38. In order to provide for engagement of a sheet of paper between the paper supply rollers 38 and 40, paper supporting plate 42 defines a pair of slots 44 therein. Motor 46 is connected to the supply roller 38 such that roller 38 may be rotated at an appropriate time to transport a sheet of paper 32 toward the drum 20. Timing information for actuating the motor 46 is provided by tachometer 48 which is driven by belt 50 from the shaft of motor 52. Motor 52 provides a rotary drive means for rotating the drum 20. Simultaneously with the engagement of a sheet of paper by rollers 38 and 40, the paper stops 36 are moved out of their respective sheet engaging positions to permit movement of a sheet of paper therepast.

A drum contacting roller 54 having a plurality of roller wheels 55 mounted on roller support arms 56 is provided for movement into contact with the drum 20. Roller 54 is moved into such contact with drum 20 to press a sheet of paper 32 against the drum 20 as the sheet is loaded onto the drum 20, as illustrated in FIG. 2. A continuously driven roller 58, shown only in FIG. 2 for clarity of illustration, provides a means for rotating the drum contacting roller 54 when the roller 54 is out of engagement with the drum 20. The rotational velocity of roller 58 is such that the roller 54 has a tangential velocity when out of contact with drum 20 which is substantially the same as the tangential velocity of the paper supporting drum 20.

A paper guide, including guide fingers 60, is provided to deflect a sheet of paper 32 as it is fed onto the drum 20. Fingers 60 are pivotably mounted on shaft 62 and each includes a notch 64 dimensioned to receive the shaft 65 of roller 54. Fingers 60 may be pivoted away from the drum 20 to permit the removal of paper from the apparatus, should jamming occur.

A fixed sheet deflector includes fingers 66 for deflecting a sheet, transported toward the drum by supply rollers 38 and 40, into a path which is substantially tangential to the periphery of the drum 20.

A paper ejector means is provided for removing a sheet of paper from the support drum 20 as the printing operation on the sheet of paper is being completed. The paper ejector means includes a plurality of paper removal fingers 68 which are movable into engagement with circumferential grooves 70 defined in the periphery of the drum 20. The stops 30 are disengaged from the leading edge of a sheet of paper 32 which is to be removed and, thereafter, the fingers 68 are moved into engagement with grooves 70 such that a sheet of paper is stripped from the drum 20, notwithstanding the maintenance of a partial vacuum within the vacuum chamber in drum 20.

A vacuum belt transport 70 includes a plurality of porous belts 72 which cooperate with an evacuated plenum 74 having a partial vacuum maintained therein by means of a vacuum source communicating therewith via vacuum tube 76. Rollers 78 and 80 support the vacuum belts 72 with roller 80 being driven by belt 82 such that a sheet of paper is transported by the belts 72 at a velocity substantially equal to the tangential velocity of the periphery of the paper supporting drum 20. Each of the paper removal fingers 68 includes a cut out portion 84 which partially surrounds the shaft 86 of roller 80 when the fingers 68 are retracted out of engagement with the grooves 70, as illustrated in FIG. 2. Pressurized chamber 86 is connected to a source of pressurized air via tube 88 which provides a means for directing air against each sheet of paper as the sheet is removed from the drum, thus urging each sheet against the fingers 68 and against the belt transport 70.

A control means is provided for controlling operation of the paper supply means and the paper ejector means such that as a sheet of paper is removed, after a plurality of rotations on the drum 20 during which printing is effectuated, another sheet is concurrently loaded onto the drum 20. This minimizes the effect of the loading and unloading cycles on the overall speed of the printer since printing will occur during at least a portion of these cycles.

The control means comprises a cam means 90 which includes a cam shaft 92 upon which cams 94, 96, 98, and 100 are mounted. Shaft 92 is rotated by means of pulley 102 and belt 104 at a rotational velocity directly proportional to the rotational velocity of the rotatable support means. The size of pulley 102 is selected such that it provides a driving connection between the cam means 90 and the rotary drive means 52 which provides for one rotation of the cam means for each plurality of rotations of the drum 20 necessary for complete printing of a sheet of paper. Thus in an embodiment in which a sheet of paper is completely printed after four rotations of the drum 20, the cam shaft 92 will be driven at one-fourth the rotational rate of the drum 20.

Each of the cams 94, 96, 98, and 100 define camming surfaces, the contours of which control the sequence of actuation of the various elements of the paper supply and ejector arrangement. Paper supply cam follower means are provided for contacting the camming surfaces as the cam means is rotated, for moving the pair of paper supply rollers 38 and 40, the paper stop 36, and the drum contacting roller 54, such that each engages a sheet of paper 32 at appropriate times to load the sheet onto the sheet supporting drum 20.

Specifically, arm 105, pivotable about shaft 106, has a cam follower roller 108 pivotally mounted thereon and is urged against cam 94 by spring 110, attached to the bottom of arm 105 and to rod 112. As cam 94 is rotated, the camming surface defined thereby pivots arm 105 such that the paper stop 36 is raised and lowered at appropriate times during the print cycle of the printer.

Arm 114, pivotally mounted upon shaft 106, has a cam follower roller 116 pivotally mounted thereon. Roller 116 is urged against cam 96 by means of spring 118 and controls pivoting of arm 41 and movement of roller 40 into engagement with supply roller 38.

Arm 120 is pivotally mounted on shaft 106 and controls pivoting of roller 54 into contact with drum 20. Arm 120 has rotatably mounted thereon cam follower roller 122 which is urged into engagement with the camming surface of cam 100 by spring 124.

In a similar fashion, the pivoting of fingers 68 about shaft 126 into engagement with grooves 70 in drum 20 is controlled by the movement of arm 128. Cam follower roller 130 is rotatably mounted on arm 128 and is urged into engagement with cam 98 by spring 132. It may be seen, therefore, that since each of the cams 94, 96, 98, and 100, complete only one revolution during the plurality of revolutions of the sheet supporting drum 20 required for printing, all of the required actuations of the paper supply and ejector elements may be provided with the appropriately shaped camming surfaces.

A print control 133 of known design provides print control signals to ink jet print head 22. The print control signals may be derived in one of several ways, including computer generation of the characters forming a text to be printed. Alternatively, print control signals may be derived from an optical scanner which scans an original document and generates appropriate control signals for reproduction of the document. Print control 133 receives tachometer output pulses from tachometer 48 and generates control signals controlling operation of motors 46 and 52.

FIG. 3, a sectional view of drum 20 taken in a plane generally perpendicular to the axis of rotation of the drum, shows the mechanism by which the paper stops 30 are actuated. Each of the stops 30 is pivotally secured to an end wall 134 of the drum 20 by a pivot 136. A spring 138, secured at one end to the drum wall 134 and at its opposite end to the stops 30, urges cam follower tab 140 into contact with stationary cam surface 142. As the drum 20 is rotated about the stationary cam surface 142, the cam follower tab 140 causes the stops 30 to extend above the drum surface so that they contact the leading edge of a sheet of paper being loaded onto the drum to insure proper positioning of the paper. The stops are thereafter retracted such that they do not interfere with removal of a sheet of paper from the drum. Extension and retraction of the stops 30 occur during each rotation of the drum, although these operations are required only during those rotations in which loading and unloading occur. During rotations in which the sheet of paper mounted on the drum is not removed, the vacuum provided through slots 28 in the drum surface continues to hold the sheet of paper securely on the drum.

Figure 4:
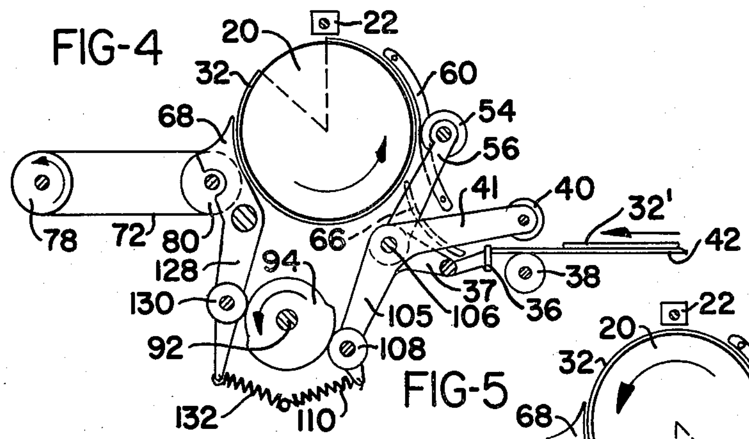
FIGS. 4–13 are diagrammatic representations of the printer of the present invention, similar to FIG. 2, showing the sequence of steps through which the printer goes in order to print successive sheets.

Reference is now made to FIGS. 4–14 which illustrate the sequence of steps required for loading and unloading the drum 20. FIG. 4 depicts the relative position of the printer elements after one revolution (360°) of the drum 20 in a system in which printing is completed during four revolutions (1440°) of the drum. Cam 94 has pivoted arm 105 such that the paper stop 36 is raised into its paper engaging position. A sheet of paper 32 on drum 20 has been printed on one-fourth of the print lines on the sheet and the next sheet to be printed 32' is being transported toward the stop 36 by a paper feed mechanism of conventional design (not shown).

Figure 5:
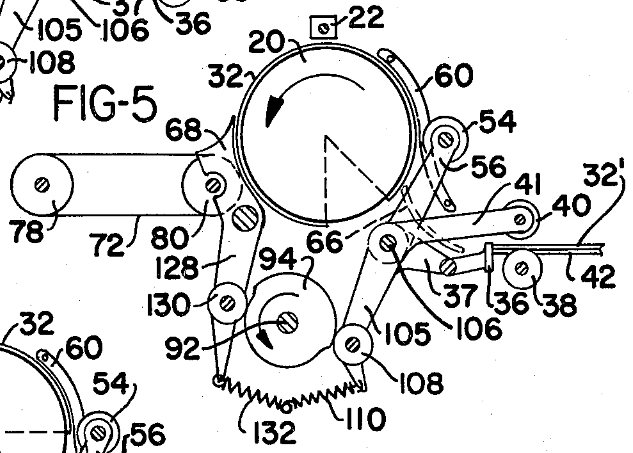

FIG. 5 shows the relationship of the printer elements after 900° of rotation. Printing is more than half completed and the sheet of paper 32' has been moved such that the leading edge of the sheet abuts the paper stop 36.

Figure 6:
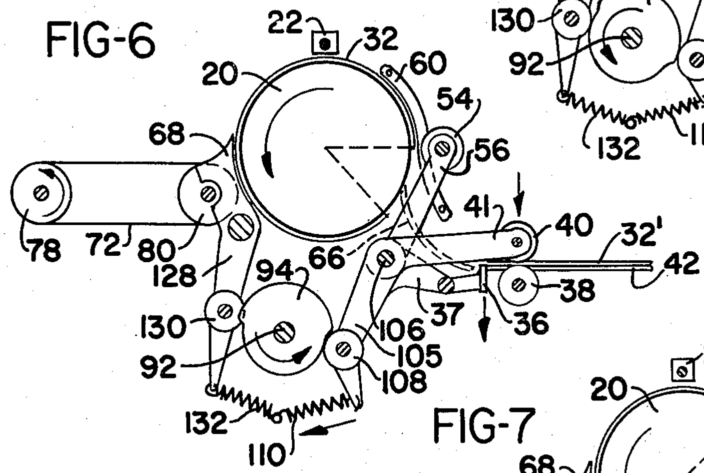

FIG. 6 shows the relationship of the printer elements after 945° of rotation. At this point, the paper stop 36 is lowered out of its paper engaging position as a result of the contour of cam 94 and the actuating force of spring 110. Simultaneously, spring 118 (FIG. 1), cam follower roller 116, and cam 96, cause the arm 114 to be pivoted, thus lowering the roller 40 and pinching the sheet of paper 32' between rollers 38 and 40.

Figure 7:
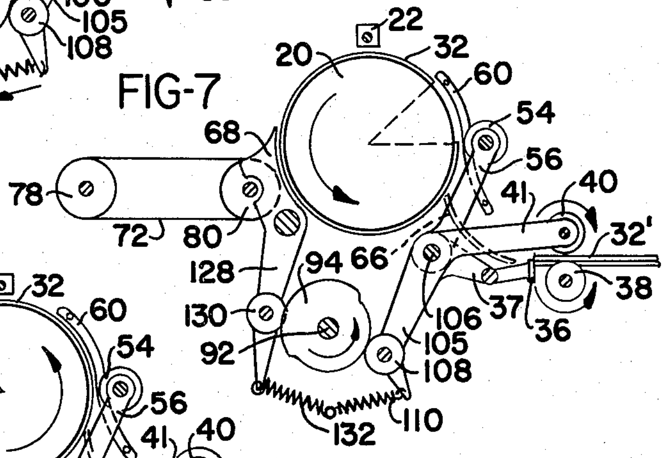

FIG. 7 illustrates the position of printer elements after 990° of rotation. At this point in the printing operation, the motor 46 is energized, and rollers 38 and 40 begin to transport the sheet 32' toward the drum 20.

Figure 8:
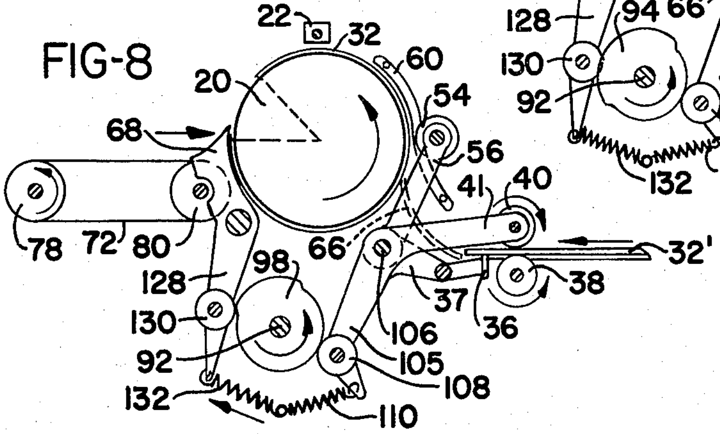

FIG. 8 illustrates the relative position of the printer elements after 1125° of rotation of drum 20. Cam 98 pivots arm 128, thus moving the fingers 68 into engagement with the grooves 70 in drum 20 in preparation for removal of sheet 32 from the drum.

Figure 9:
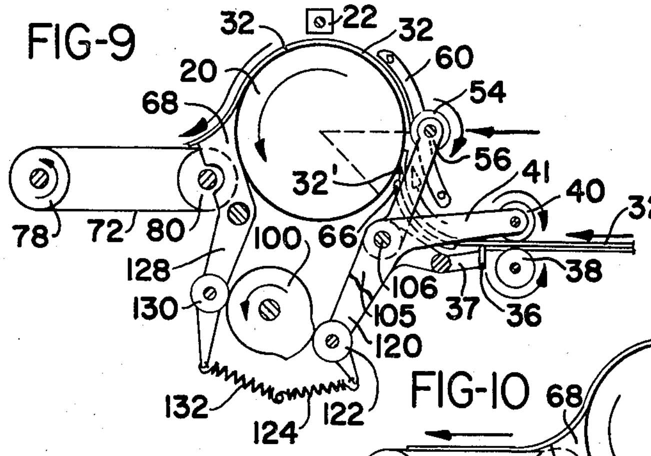

FIG. 9 illustrates the relative position of printer elements after 1305° of rotation of drum 20. At this point, arm 120 is pivoted by cam 100 against the spring force of spring 124 to move the roller 54 into contact with the drum 20. The sheet of deflector 66 has deflected the sheet 32' upward into a path which is substantially tangential to the periphery of the drum 20.

Figure 10:
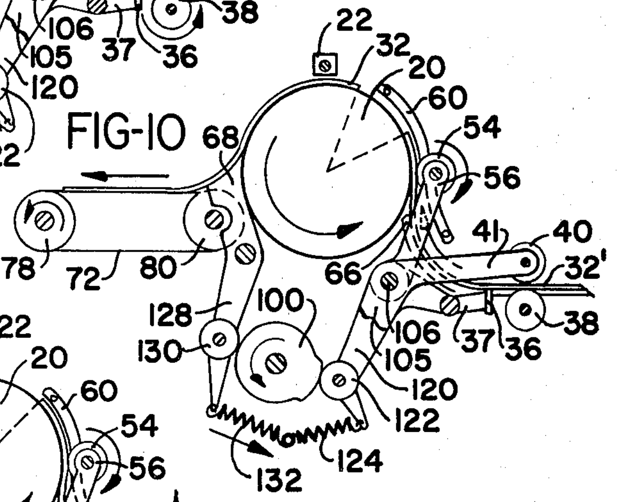

FIG. 10 illustrates the relative position of printer elements after 1362° of rotation of drum 20. Energization of motor 46 is terminated since the sheet of paper 32' is firmly engaged on the drum 20. Subsequent movement of the sheet 32' between rollers 38 and 40 results, therefore, solely from the rotation of the drum 20.

Figure 11:
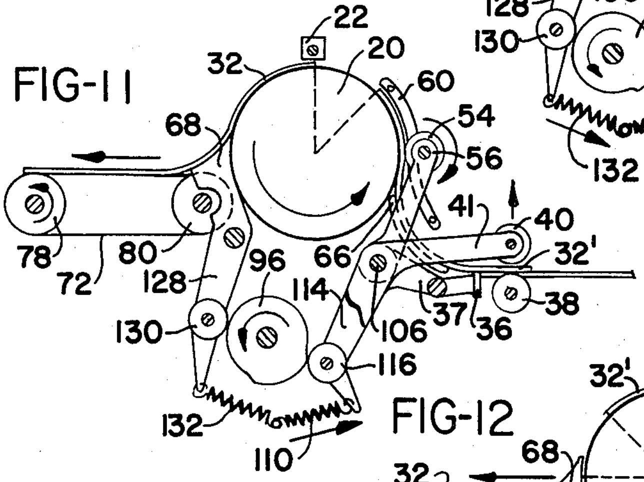

FIG. 11 illustrates the relative position of printer elements after 1395° of rotation of the drum 20. At this point, printing on sheet 32 is completed and more than half of the sheet 32 has been stripped from the surface of the drum 20. The roller 40 is raised as arm 114 is pivoted by cam 96.

Figure 12:
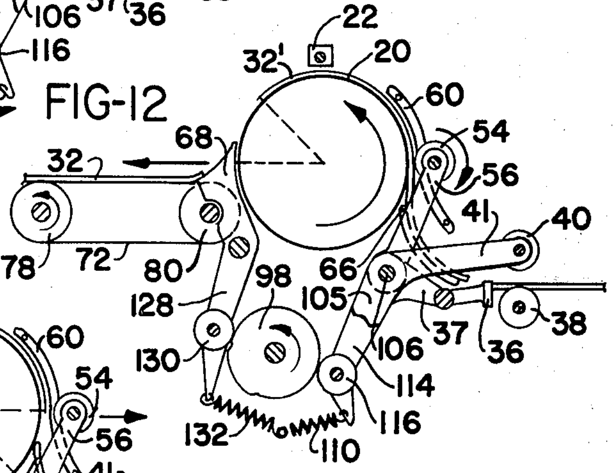

FIG. 12 shows the relative position of printer elements after 1485° of rotation of drum 20. The fingers 68 are pivoted away from the drum 20 by movement of arm 128 controlled by cam 98. At this point, the sheet of paper 32 has been removed completely from the drum 20 and is being carried to a paper storage station by the vacuum belt transport.

Figure 13:
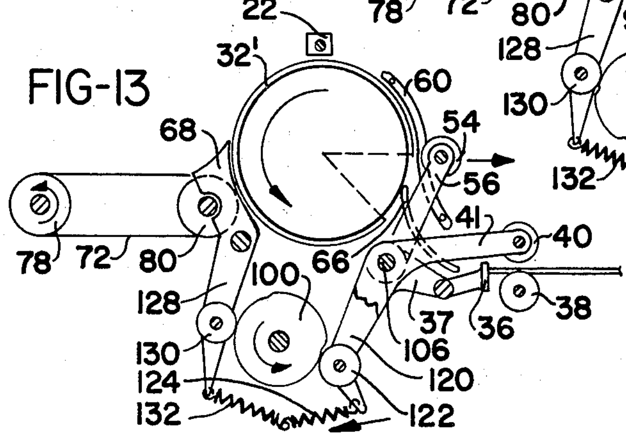
Figure 14:
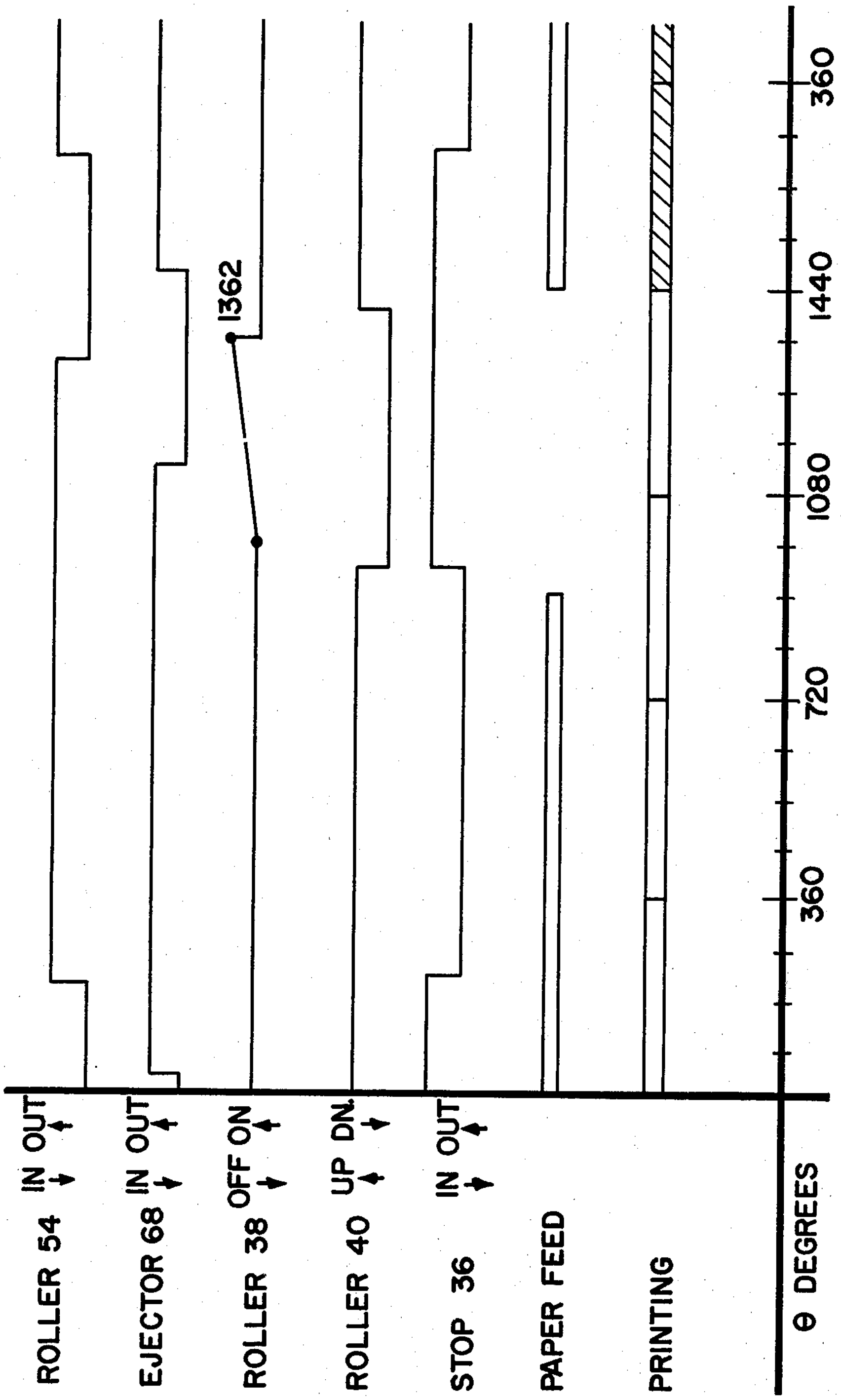
FIG. 14 is a timing diagram illustrating the actuation sequence of elements of the paper handling system associated with the printer.

Finally, FIG. 13 illustrates the relative position of printer elements after 1665° of rotation of the drum 20. The roller 54 is moved away from the drum 20, as shown, by the contour of cam 100. Additionally, the paper stop 36 is raised by the rotation of arm 105 by cam 94. The printing of sheet 32' continues with the printer elements cycling through the steps shown in FIGS. 4–14 for each sheet of paper which is loaded onto the drum 20 and printed. FIG. 14 illustrates the sequence of printer element actuation diagrammatically. As is clear, the sequence repeats after each 1440° of rotation of the drum 20.

While the method herein described, and the form of apparatus for carrying this method into effect, constitute preferred embodiments of the invention, it is to be understood that the invention is not limited to this precise method and form of apparatus, and that changes may be made in either without departing from the scope of the invention.

What is claimed is:

1. An ink jet printer comprising:
 rotatable support means for supporting a sheet of paper,
 rotary drive means for rotating said support means,
 an ink jet print head mounted adjacent said support means for printing on a sheet of paper supported thereon during a plurality of successive rotations of said support means,
 a print control means for providing print control signals to said ink jet print head,
 paper supply means for loading a sheet of paper onto said support means such that said sheet of paper is supported on said support means,
 paper ejector means for removing a sheet of paper from said support means, and
 control means for controlling operation of said paper supply means and said paper ejector means such that as a sheet of paper is removed, after a plurality of rotations on said support means, another sheet is concurrently loaded onto said support means, whereby the time required for loading and unloading a sheet of paper is minimized and the overall speed of the printer enhanced.

2. The printer of claim 1 in which said support means includes a paper supporting drum defining a plurality of circumferential grooves and said paper ejector means includes a plurality of paper removal fingers, movable into engagement with said grooves, for removing a sheet of paper from said drum.

3. The printer of claim 2 in which said paper ejector means further comprises:
 a vacuum belt transport adjacent said paper removal fingers for transporting the sheets of paper removed from said paper supporting drum by said fingers to an ejector storage station, and
 means for blowing air against each sheet as it is removed from said drum such that each sheet is urged against said fingers and against said vacuum belt transport.

4. The printer of claim 3 in which said paper ejector means further comprises means for driving said vacuum belt transport such that a sheet of paper is transported thereby at a velocity substantially equal to the tangential velocity of the periphery of said paper supporting drum.

5. The printer of claim 1 in which said support means includes a paper supporting drum and in which said paper supply means comprises:
 a pair of paper supply rollers for engaging a sheet of paper therebetween and transporting the sheet of paper so engaged toward said drum,
 a paper stop, between said supply rollers and said drum, movable into a sheet engaging position, for positioning a sheet prior to engagement by said supply rollers,
 a sheet deflector positioned adjacent said drum such that a sheet transported toward said drum by said supply rollers is directed into a path substantially tangential to the periphery of said drum, and
 A drum contacting roller, mounted for movement into contact with said drum, for pressing a sheet of paper against said drum as the sheet is loaded onto said paper supporting drum.

6. The printer of claim 5 further comprising means for rotating said drum contacting roller, when said drum contacting roller is out of contact with said drum, at a rotational rate such that said tangential velocity of the periphery of said drum contacting roller is substantially the same as the tangential velocity of said paper supporting drum.

7. The printer of claim 5 in which said control means comprises:
 cam means defining camming surfaces,
 means for rotating said cam means at a rotational velocity directly proportional to the rotational velocity of said rotatable support means, and
 paper supply cam follower means, contacting said camming surfaces as said cam means is rotated, for moving said drum contacting roller, such that each engages a sheet of paper at appropriate times to load the sheet onto said paper supporting drum.

8. The printer of claim 7 in which said paper supporting drum defines a plurality of circumferential grooves, said paper ejector means includes a plurality of paper removal fingers, movable into engagement with said grooves, for removing a sheet of paper from said drum, and in which said control means further comprises paper ejector cam follower means, contacting said camming surfaces as said cam means is rotated, for moving said plurality of paper removal fingers into engagement with said grooves at the appropriate time to remove a sheet of paper from said drum after the sheet has been supported by the drum during a plurality of rotations of the drum.

9. The printer of claim 7 in which said means for rotating said cam means comprises a driving connection between said cam means and said rotary drive means.

10. The printer of claim 9 in which said driving connection provides for one rotation of said cam means for each said plurality of rotations of said rotatable support means during which a sheet is printed by said printer.

11. A printer for successively printing upon a plurality of sheets of print receiving material by printing along a plurality of print lines on each sheet comprising:
 rotatable support means for supporting a sheet of print receiving material,
 drive means for rotating said rotatable support means,
 supply means, positioned adjacent one side of said rotatable support means, for loading a sheet of print receiving material thereon,
 a print head, adjacent said rotatable support means, for printing along a number of said plurality of print lines during each rotation of said rotatable support means such that, after a plurality of rotations of said rotatable support means, printing is accomplished along all of said plurality of print lines,
 ejector means, positioned adjacent said rotatable support means on a side thereof substantially opposite said supply means, for removing a sheet of print receiving material from said rotatable support means after printing is accomplished along all of said plurality of print lines, and control means for controlling loading of a sheet by said supply means and removal of a sheet by said ejector means such that printing is initiated before a sheet is completely loaded onto said support means, continues during a plurality of rotations of said support means, and terminates after a portion of the sheet has been removed, whereby the time required for loading and unloading of a sheet is minimized and the overall speed of the printer is enhanced.

12. The printer of claim 11 in which said control means comprises a cam means, means for rotating said cam means at a rotational velocity related to the rotational velocity of said rotatable support means, supply cam follower means, cooperating with said cam means, for actuating said supply means, and ejector cam follower means, cooperating with said cam means, for actuating said ejector means.

13. The printer of claim 11 in which said control means controls loading of a sheet by said supply means such that loading is initiated simultaneously with printing and removal of a sheet previously loaded onto said rotatable support means.

14. The printer of claim 13 in which said control means controls removal of a sheet by said ejector means such that removal of a sheet is initiated during printing of the sheet and is completed after loading and printing of a successive one of said plurality of sheets is initiated.

15. A method of printing successively upon a plurality of sheets of print receiving material, printing occurring along a plurality of parallel print lines on each sheet to form a print image thereon, comprising the steps of:

(a) rotating a sheet supporting drum adjacent a printer, (b) supplying a sheet of print receiving material to the rotating sheet supporting drum and loading said sheet thereon, (c) initiating printing along a number of print lines on said sheet of print receiving material as said sheet is loaded onto said drum, (d) rotating said drum a predetermined number of times while printing along different ones of said plurality of print lines during each rotation of said drum, (e) removing said sheet from said drum on a side of said drum substantially opposite to that at which said sheet was loaded onto said drum, (f) continuing printing of said sheet during removal of said sheet from said drum, (g) initiating loading of a sheet of print receiving material onto said drum prior to termination of printing of the sheet being removed from said drum, and (h) repeating each of said steps (c) - (g) for each successive sheet which is to be printed.

* * * * *